United States Patent [19]

Kubis

[11] Patent Number: 4,915,598

[45] Date of Patent: Apr. 10, 1990

[54] AUXILIARY DRIVE OF AN INTERNAL COMBUSTION ENGINE FOR AN AIR COMPRESSOR

[75] Inventor: Heribert Kubis, Nuremberg, Fed. Rep. of Germany

[73] Assignee: MAN Nutzfahrzeuge GmbH, Munich, Fed. Rep. of Germany

[21] Appl. No.: 306,329

[22] Filed: Feb. 3, 1989

[30] Foreign Application Priority Data

Feb. 13, 1988 [DE] Fed. Rep. of Germany ....... 3804575

[51] Int. Cl.$^4$ ............................................. F04B 35/00
[52] U.S. Cl. ...................................... 417/380; 74/397
[58] Field of Search .................. 417/364, 480; 74/397, 74/409; 92/140

[56] References Cited

U.S. PATENT DOCUMENTS

| | | | |
|---|---|---|---|
| 1,196,609 | 8/1916 | Stewart | 417/364 |
| 2,444,734 | 7/1948 | Gillett | 74/397 |
| 2,552,703 | 5/1951 | Alonso | 417/539 |
| 3,888,134 | 6/1975 | Miranda | 74/409 |
| 4,671,223 | 6/1987 | Asano et al. | 123/90.31 |

Primary Examiner—John J. Vrablik
Assistant Examiner—Robert Blackmon
Attorney, Agent, or Firm—Robert W. Becker

[57] ABSTRACT

A gear wheel drive air compressor which is constructed as a piston compressor, the drive gear wheel of which on the air compressor crankshaft meshes with a gear wheel on the camshaft of the internal combustion engine. The inventive construction prevents the reverse acceleration of the camshaft drive gear wheel and minimizes the knocking pulse and noise in the mesh of the camshaft gear wheel in that the transmission ratio between the air compressor drive gear wheel and the camshaft gear wheel is embodied as a multiple load cycle of the camshaft drive torque, and at the same time the angular position of the air compressor crankshaft relative to the camshaft is fixed such that negative torque components of the air compressor crankshaft are eliminated by the overlapping of positive torque components of the camshaft. Furthermore, the air compressor drive gear wheel is arranged in alignment with the air compressor crankshaft.

4 Claims, 2 Drawing Sheets

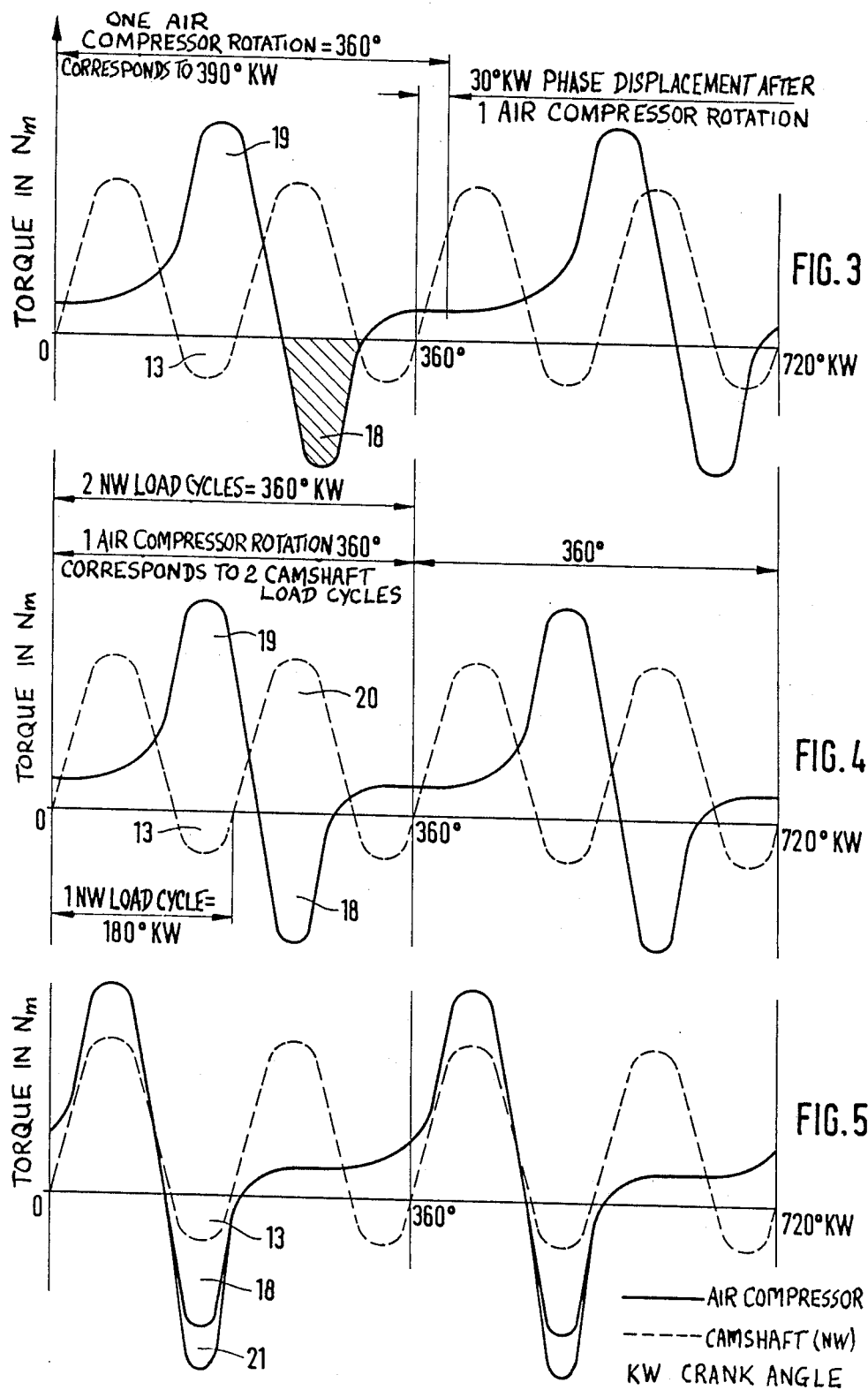

AUXILIARY DRIVE OF AN INTERNAL COMBUSTION ENGINE FOR AN AIR COMPRESSOR

BACKGROUND OF THE INVENTION

The present invention relates to an auxiliary drive of an internal combustion engine for an air compressor. The compressor has a piston that is guided in a cylinder and that is driven via a connecting rod by a crankshaft. The crankshaft is connected to a drive gear wheel, which is driven by the drive shaft of the internal combustion engine by means of gear wheels. The air compressor drive gear wheel meshes with a gear wheel on the camshaft.

The gear wheel drive of piston compressors, which are used, among other things, for providing compressed air for commercial vehicles that have air brakes, has a series of advantages. The most important advantage, when compared with the earlier frequently used V-belt drives, is that gear wheel drives are completely maintenance-free. This advantage gains in importance due to the fact that a steering hydraulic pump is often driven by the air compressor crankshaft; this further increases the requirement for maximum possible operating reliability of the air compressor drive, which is optimally possible only by using gear wheels.

The piston compressor type of construction has proven to be very expedient for use in the case of brake air compressors. However, the disadvantage of using a gear wheel drive is that the compressed air that remains in the cylinder clearance of the air compressor once the top dead center has been reached expands, as a result of which the tangential force that drives the air compressor suddenly becomes negative and the air compressor releases torque. This leads to a sudden flank change in the tooth mesh accompanied by an unpleasant banging noise.

It is not always possible to reduce this noise to an acceptable level, particularly in the case of lightweight drives as are used in modern high output engines, even when the rotating flank clearance between the air compressor gear wheel and the driving camshaft gear wheel is manufactured or adjusted to low values. The reason for this lies in the fact that the drive torque of the camshaft also varies greatly, particularly in the case of engines having a small number of cylinders, and may even have negative components. If there is an overlapping of the negative torque of the air compressor in the phase of reexpansion with small or even negative torque of the camshaft, then in addition to the air compressor gear wheel there is also a reverse acceleration of the camshaft gear wheel, which is transmitted as a jolt to the rest of the gear drive.

It is not possible to consider removing this disadvantage by means of a large increase in the rotating masses of the air compressor and the camshaft gear wheel for reasons of low costs, limited structural space, and low weight. The increase in the moment of inertia would have to be considerable and therefore expensive heavy, and space-consuming, since the disturbing noises occur particularly during idling. However, due to the low idling speed, the kinetic energy of the rotating masses is low in this operating condition.

It is therefore an object of the present invention to form the drive in such a way that with a low moment of inertia, small dimensions, and a light construction of the rotating masses of the air compressor and of the driving camshaft gear wheel, the reverse acceleration of the camshaft gear wheel is prevented and the knocking pulse and noise in the mesh of the camshaft gear wheel is minimized.

BRIEF DESCRIPTION OF THE DRAWINGS

This object, and other objects and advantages of the present invention, will appear more clearly from the following specification in conjunction with the accompanying schematic drawings, in which:

FIG. 3 is a view that shows a graph illustrating the torque behavior of camshaft and air compressor plotted over a 720° crank angle operating cycle, with the transmission ratio of the air compressor in a known manner not representing a multiple of a camshaft load cycle;

FIG. 4 is a view that shows a graph of the same type as in FIG. 3, but with the transmission ratio of the air compressor representing, according to the invention, a multiple of a camshaft load cycle, and the angular position of the air compressor crankshaft being aligned with the camshaft; and FIG. 5 is a view that shows a graph of the same type as in FIG. 4, with the transmission ratio of the air compressor again representing a multiple of a camshaft load cycle, but there being no aligned assembly of the air compressor crankshaft relative to the camshaft.

SUMMARY OF THE INVENTION

Pursuant to the present invention, the auxiliary air compressor drive of the aforementioned general type is characterized primarily in that the air compressor drive gear wheel is arranged in alignment with the air compressor crankshaft, and in that the transmission ratio between the air compressor drive gear wheel and the camshaft gear wheel is a multiple of a load cycle of the camshaft drive torque and at the same time the angular position of the air compressor crankshaft relative to the camshaft is fixed such that negative torque components of the air compressor crankshaft are eliminated by the overlapping of positive torque components of the camshaft.

By means of the present invention, an addition of the negative torque components of the air compressor and the camshaft is avoided. The disturbing negative torque components of the air compressor are cancelled out by the dominant positive drive torque of the camshaft. This results in a prevention of undesired reverse acceleration of the camshaft gear wheel and resulting pulses that act on the remainder of the gear drive. The reverse acceleration of the air compressor gear wheel per se, however, is fully maintained as a result of the reexpansion of the air compressor. Although the pulse thereof does not have to be absorbed by the camshaft gear wheel, it does not result in a negative acceleration of the camshaft gear wheel due to the association of the torque curves described above. According to a further development of the invention, it is, however, possible to minimize this unavoidable knocking pulse of the air compressor gear wheel relative to the camshaft gear wheel against the direction of rotation by means of the narrow tooth clearance in the mesh between the two gear wheels, so that disturbing noises are avoided.

Further specific features of the present invention will be described in detail subsequently.

DESCRIPTION OF PREFERRED EMBODIMENTS

Figure 1:
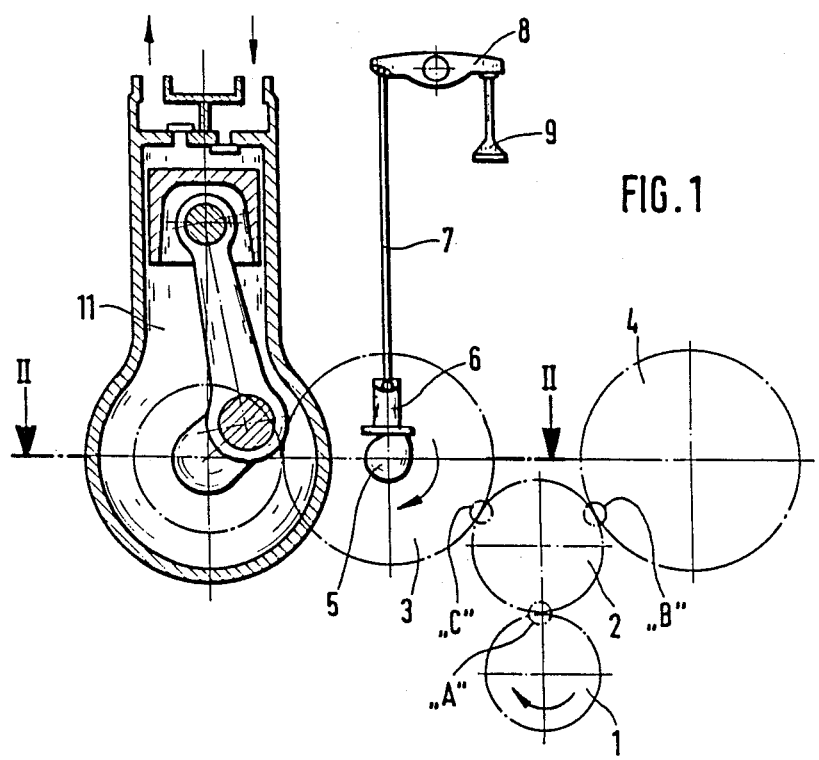
FIG. 1 is a cross-sectional view through one exemplary embodiment of the inventive auxiliary drive for an air compressor, the drive gear wheel of which meshes with a gear wheel on the camshaft.
Figure 2:
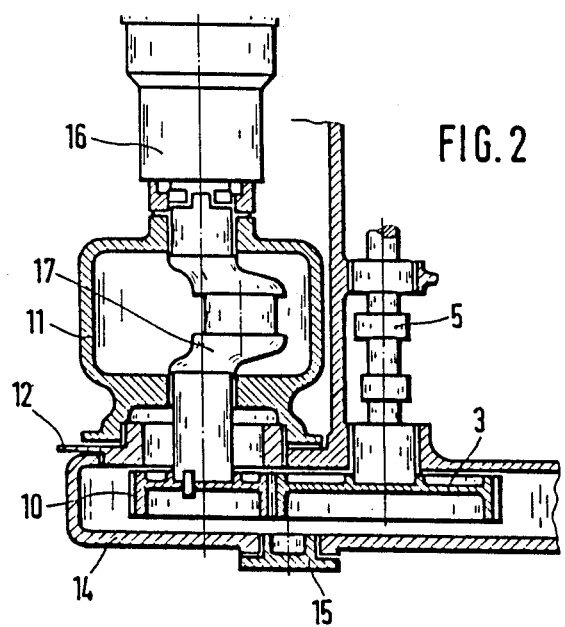
FIG. 2 is a cross-sectional view taken along line II—II of FIG. 1.

Referring now to the drawings in detail, in FIGS. 1 and 2, an internal combustion engine crankshaft gear wheel 1 drives a camshaft gear wheel 3 and an injection pump gear wheel 4 via an intermediate gear 2. The reference numeral 5 designates the camshaft, which actuates valves 9 in the cylinder head of the engine via a ram or tappet 6, push rod 7, and rocker arm 8.

A drive gear 10 meshes with the camshaft gear wheel 3 so as to drive a crankshaft 17, which is associated with an air compressor 11. In the embodiment illustrated, a fine adjustment of the rotating flank clearance between the air compressor gear wheel 10 and the camshaft gear wheel 3 is effected by means of an eccentric or cam 12, which is accessible from the outside and which is arranged between the engine housing 14 and the air compressor 11 By rotating the cam 12, it is possible to adjust the tooth clearance in precise measured degrees. It is, however, also possible to effect the tooth clearance adjustment by the simple displacement of the air compressor 11 and by controlling the clearance of the tooth flanks in the mesh of the gear wheels 3 and 10 by means of a spy plate after the removal of a locking screw 15. It is, of course, possible to completely dispense with an adjustment of the tooth clearance in cases where the gear wheels 3 and 10 can be manufactured with the necessary low tolerances, in particular with respect to their gauge width and the associated distance between axes. As can be seen from FIG. 2, a steering or power hydraulic pump 16 can also be flanged onto the air compressor 11.

The arrangement of the control gear wheels as is shown in particular in FIG. 1 has the advantage that it is hereby possible to drive the injection pump or camshaft, which is advantageously disposed on the right or left side of the engine, by means of economical gear wheels that have small dimensions. Furthermore, as a result of a prime number ratio of the number of teeth of the gears 1, 3 and 4 relative to the intermediate gear 2, it is ensured that at the moment of the respective load peaks in the heavily loaded tooth meshes A, B and C, the flanks of different teeth mesh in each case, and the possibility of increased wear as a result of the same flanks always being required to transmit the load peaks is reduced, so that the toothing can be designed to be lighter and more economical.

FIG. 3 shows the driving moment of the camshaft 5 (shown by a broken or dashed line) of a 4-cylinder engine over a 720° crank angle operating cycle. There are four load cycles, each with a 180° crank angle and a small negative torque component 13. Overlapping the camshaft drive moment is the drive moment for the air compressor 11 (shown by a solid line), with the negative component 18 as a result of the reexpansion. The transmission ratio between the camshaft gear wheel 3 and the air compressor gear wheel 10 is selected in conformity with the desired air delivery rate such that, for example, during an air compressor rotation of 360°, there is a 30° crank angle phase displacement (i.e. one air compressor rotation of 360° corresponds to a 390° crank angle). With the camshaft load cycle length of 180°, the starting position (starting phase relationship) between the air compressor and camshaft is repeated every 180°: 30° = six air compressor rotations. During these six rotations, the negative torque maxima of the air compressor and camshaft drive moments also combine once. This leads to a reverse acceleration of the camshaft gear wheel 3, particularly during engine idling with a low kinetic energy of the rotating masses, which reverse acceleration results in a clearly audibly noticeable knocking pulse in the remaining gear drive and leads to an annoying, periodic generation of noise.

In the situation of FIG. 4, the reverse acceleration of the camshaft gear wheel 3 is prevented in that the transmission ratio between the air compressor drive gear wheel 10 and the camshaft gear wheel 3 is effected or embodied as a multiple of a camshaft load cycle. In the example, one air compressor rotation (360°) corresponds exactly to two camshaft load cycles, each of 180°, which is particularly advantageous in the case of 4-cylinder engines. The same rotational speed ratio between engine and air compressor would be obtained in the case of a comparable 6-cylinder engine with three camshaft load cycles per air compressor rotation in conformity with the multiple three.

In addition, the air compressor drive gear wheel 10 is arranged aligned with the air compressor crankshaft 17 (with a view to a correct and precise tooth position o tooth association). At the same time, the angular position of the air compressor crankshaft 17 relative to the camshaft 5 is fixed (which is ultimately effected by means of the correct angular position of the gear wheels 10 and 3). The described association has the effect that the negative moments 18 of the air compressor 11 are optimally cancelled out by the positive torque components 20 of the camshaft 5.

A generally not complete but usually sufficient reduction of the above-mentioned negative moments 18 by means of the positive torque components 20 can also be obtained in situations where an exact alignment of the air compressor drive gear wheel 10 is dispensed with or dropped. However, this is possible only where the tooth pitch is small and the maximum inaccuracy without alignment of a half tooth pitch in each case in and against the direction of rotation does not impair the inventive effect of the fixed arrangement of the air compressor crankshaft 17 relative to the camshaft 5.

For further clarification, FIG. 5 shows that in the situation of a non-aligned arrangement (of the air compressor crankshaft relative to the camshaft), the negative torque (18, 13) of the air compressor and camshaft can combine in an undesirable manner to form a negative torque maximum 21 in spite of the fact that the transmission ratio of the gear wheels 3 and 10 is a multiple of a camshaft load cycle.

In the situation of engines having a larger number of cylinders, the camshaft drive moment often no longer has any negative components. However, between the individual load cycles of the camshaft, the camshaft drive moment is reduced to low values only slightly above zero, so that the negative torque of the air compressor can become almost fully effective at these points. In order to reliably prevent noise pulses, an aligned arrangement of the air compressor and a transmission ratio of the air compressor as a multiple of a camshaft load cycle is therefore also proposed in this situation, so that the negative components of the air compressor drive torque are cancelled out by the positive camshaft drive moments.

The present invention is, of course, in no way restricted to the specific disclosure of the specification and drawings, but also encompasses any modifications within the scope of the appended claims.

I claim:

1. In an auxiliary drive of an internal combustion engine for an air compressor, which is constructed as a piston compressor having a piston that is guided in a cylinder and that is driven via a connecting rod by a crankshaft, which is connected to a drive gear wheel that is driven by the drive shaft of the internal combustion engine by means of gear wheels, with said air compressor drive gear wheel meshing with a gear wheel of a camshaft, comprising the improvement therewith wherein:

said air compressor drive gear wheel is arranged in alignment with said air compressor crankshaft;

the transmission ratio between said air compressor drive gear wheel and said camshaft gear wheel is an integral multiple of a load cycle of the camshaft drive torque; and at the same time, the angular position of said compressor crankshaft relative to said camshaft is fixed such that negative torque components of said air compressor crankshaft are eliminated by the overlapping of positive torque components of said camshaft with which reverse acceleration of said camshaft gear wheel is prevented with any knocking pulse and noise in mesh of said camshaft gear wheel is minimized.

2. An auxiliary drive according to claim 1, in which the mesh between said air compressor drive gear wheel and said gear wheel of said camshaft, a rotating flank is manufactured with a nominal tolerance.

3. An auxiliary drive according to claim 1, in which in the mesh between said air compressor drive gear wheel and said gear wheel of said camshaft, an adjustment device is provided for adjusting a rotating flank clearance to a nominal value.

4. An auxiliary drive according to claim 3, in which said adjustment device is a cam.

* * * * *